Figure 1:
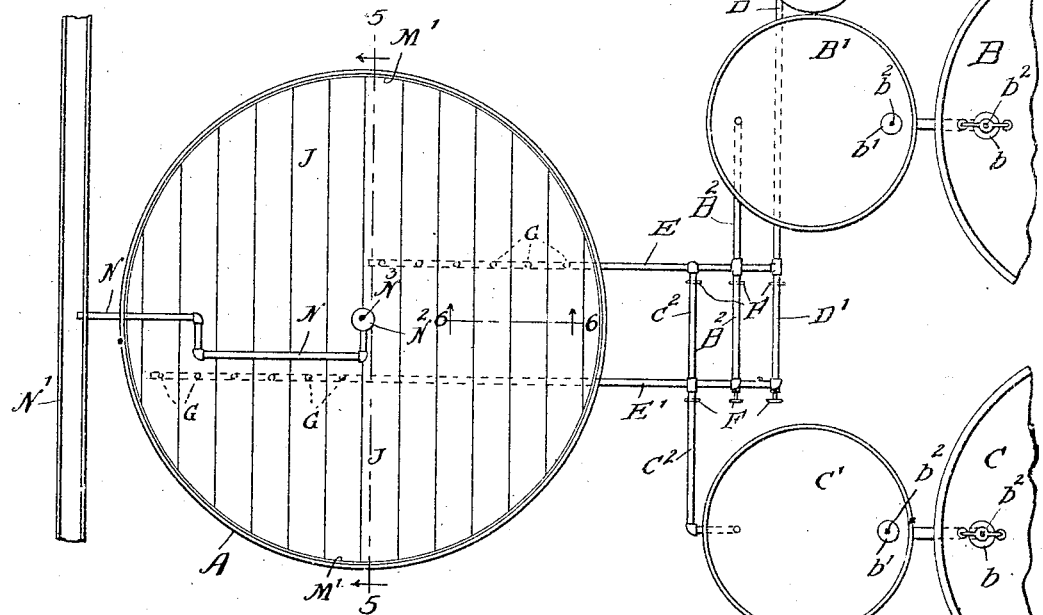

No. 774,736. PATENTED NOV. 15, 1904.
D. C. BOLEY.
APPARATUS FOR TREATING FINELY DIVIDED MATERIAL FOR THE RECOVERY OF METALS.
APPLICATION FILED APR. 13, 1903.
NO MODEL. 2 SHEETS—SHEET 1.

Witnesses:
Wm Geiger
H. W. Munday

Inventor:
Daniel C. Boley
By Munday, Evarts & Adcock
Attorneys

No. 774,736. PATENTED NOV. 15, 1904.
D. C. BOLEY.
APPARATUS FOR TREATING FINELY DIVIDED MATERIAL FOR THE RECOVERY OF METALS.
APPLICATION FILED APR. 13, 1903.
NO MODEL. 2 SHEETS—SHEET 2.
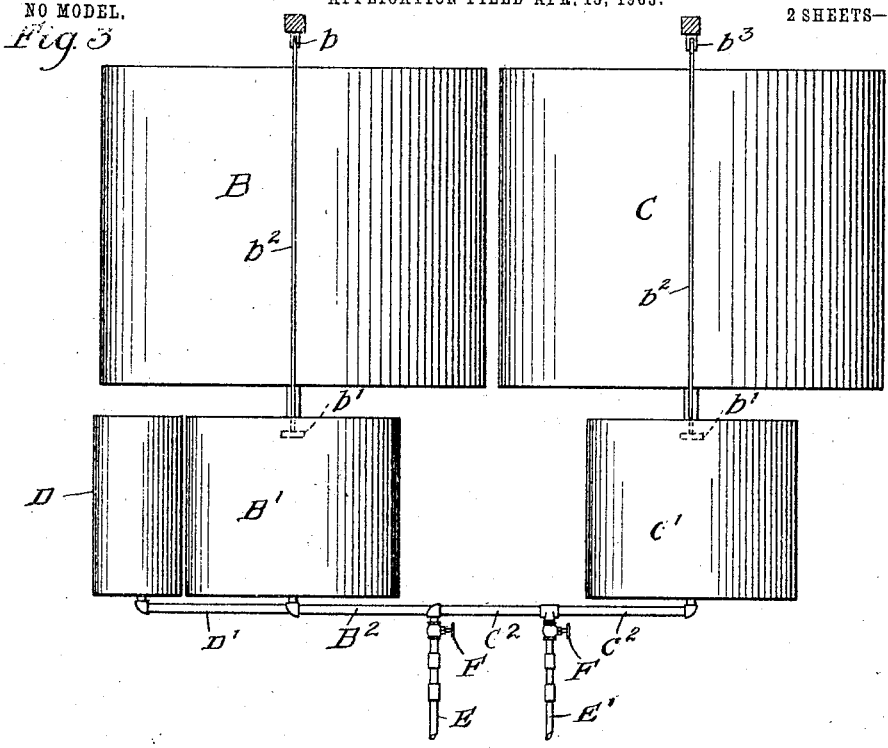
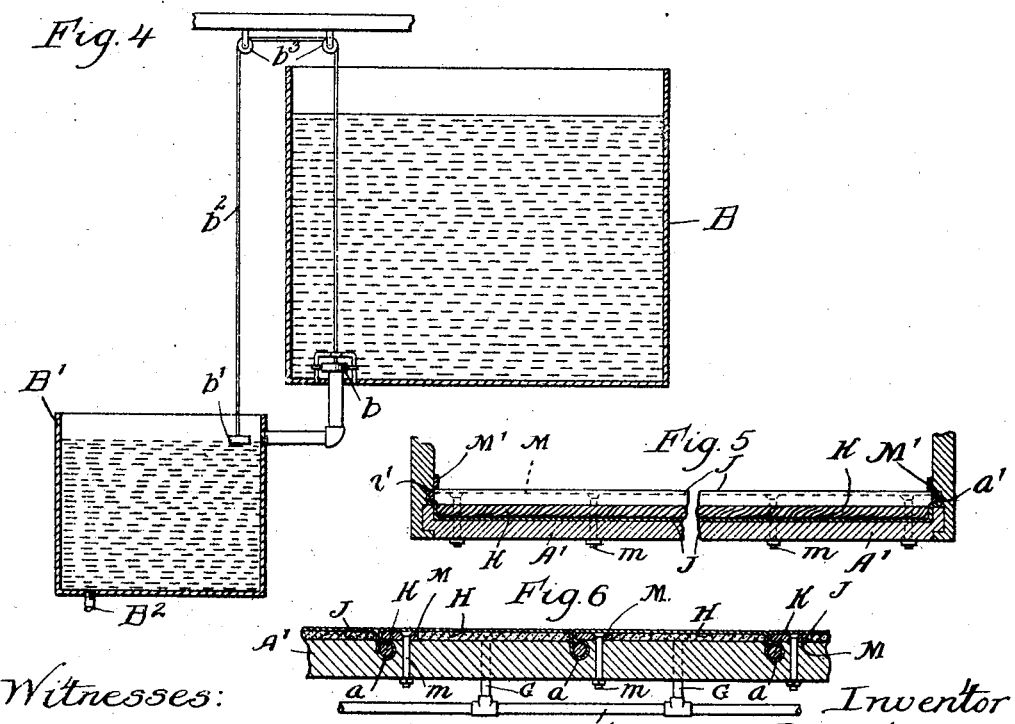
Witnesses:
Wm. Geiger
Inventor
Daniel C. Boley
By Munday, Evarts & Adcock,
Attorneys No. 774,736.

Patented November 15, 1904.

UNITED STATES PATENT OFFICE.

DANIEL C. BOLEY, OF DEADWOOD, SOUTH DAKOTA.

APPARATUS FOR TREATING FINELY-DIVIDED MATERIAL FOR THE RECOVERY OF METALS.

SPECIFICATION forming part of Letters Patent No. 774,736, dated November 15, 1904.

Application filed April 13, 1903. Serial No. 152,365. (No model.)

*To all whom it may concern:*

Be it known that I, DANIEL C. BOLEY, a citizen of the United States, residing in Deadwood, in the county of Lawrence and State of South Dakota, have invented a new and useful Improvement in Apparatus for Treating Finely-Divided Material for the Recovery of Metals, of which the following is a specification.

My invention relates to an improved apparatus for treating finely-divided material—such as pulverized rock, sands, talc, clay, and slimes—for the recovery of gold, silver, or other metals contained therein by the use of solvents. It has been specially employed for the purpose of recovering gold from slimes by means of a solution of cyanid of potassium, the gold being subsequently taken from said solution.

The invention consists in the means employed for passing air, water, or solution upward through the mass of slime, powder, or sand and which is shown in the drawings, or described in the following specification, in which—

Figure 2:
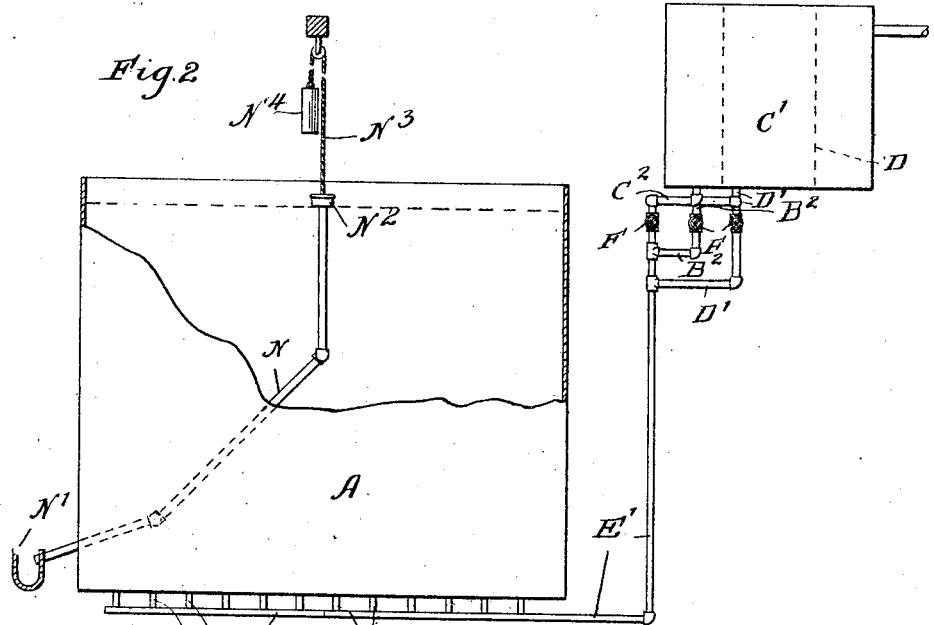

Figure 1 is a plan view of the apparatus; Fig. 2, a side elevation; Fig. 3, a front elevation of the supply-tank arrangement; Fig. 4, a section on line 4 4 of Fig. 3; Fig. 5, a section, on a larger scale, on line 5 5 of Fig. 1 to show the construction of filter arrangement; and Fig. 6 is a similar section on line 6 6 of Fig. 1.

In said drawings, A represents the filter-tank in which the material is treated.

B is a supply-tank for containing a supply of solution of cyanid of potassium or other solvent employed, which is usually called "barren solution"—that is to say, one that does not yet contain any gold or silver metal or has been exhausted thereof as far as practical.

B' at a lower level is a subsidiary tank for the purpose of determining and regulating the hydraulic head and consequent amount of pressure of this liquid on the filter fabric and the contents of tank A.

C is a tank similar to B, but for containing water, and C' its similar subsidiary head-determining tank.

A convenient means for regulating and maintaining the desired head in the tank B' C' is shown at Fig. 4, where $b$ is a valve controlling the outlet of tank B and $b'$ a float in tank B', the valve and float being connected by the cord $b^2$ passing over pulleys $b^3$. When the water-line rises to a certain previously determined and regulable height in tank B', the float being lifted permits the valve to close or partially close, and thus prevents the delivery of more liquid, and when the water-line is lowered below this level the weight of the float opens the valve to admit a further supply. By this or other well-known means the height of the head of liquid is regulated and kept constant and the amount of pressure on the contents of tank A determined and adjusted, as desired.

D is a tank or closed vessel or other supply containing compressed air or gas, if it be desired to use such.

The tank B' by means of the pipe $B^2$; the tank C' by means of the pipe $C^2$, and the air-supply D by means of the pipe D' are each connected to the two pipes E E', valves being provided for cutting either or all, as at F F F F F.

The pipes E E', it will be seen, pass below the tank A, and from them short riser-pipes G, one for each section of the filter, extend up through the tank-bottom, delivering below the filtering medium. Of course instead of two pipes E E' a single pipe might be employed; but I prefer to use the two pipes, one delivering to one half of the filter-surface and the other to the other half or portion, as this affords a convenient means for agitating the contents of the tank A by creating currents therein, which may be done by cutting off the air from one side, whereby the supply from the other side will create a rolling action in said contents, so that the same will be thoroughly stirred when required.

The filter at the bottom of the filter-tank is constructed as follows: The bottom planking A' of the tank A is traversed on its upper surface by grooves $a$ at intervals of, say, one foot, the grooves running entirely across the floor of the tank. Between these grooves are placed strips H of fibrous and porous matting—such, for example, as what is known as "cocoa" matting. These strips are not absolutely essential; but I prefer to employ them for producing a more nearly level bottom for the canvas now to be mentioned. The canvas J may be any ordinary stout cotton or linen duck fabric, or, if preferred, some special fabric, if the solutions are such as to eat or destroy cotton or linen, may be employed. This canvas may preferably be cut into strips wide enough to laterally cover the distance between two or more of the grooves $a$, and they should be long enough to reach from side to side of the tank and to enter the packing-grooves $a'$ in said sides. The canvas is attached to the floor of the tank as follows: The strip beginning at one side of the tank is laid down on the floor and secured to the bottom of the tank by driving down upon it a rope K, placed over the underlying groove $a$. The canvas is then folded back over the rope, and a cleat or batten-strip M, which I prefer to make of iron, is placed down upon the canvas, with one of its edges resting above the rope and extending to the other edge of the groove. This batten is secured to the planking of the tank-bottom by bolts or screws $m$, whose heads should be countersunk. By this means the canvas is secured to the floor of the tank without perforation, and consequently without danger of subsequent leakage. The folded-back portion of the canvas strip is now turned down and brought over the batten toward the next groove $a$, where the operation is repeated. The joinings between the canvas strips where they occur are made in the grooves $a$ by lapping adjacent strips together under the wedge-rope. After all of the canvas strips are thus secured to the bottom by the grooves $a$, ropes K, and battens M the edges are secured to the sides of the tank all around by entering the canvas in the compartmental groove $a'$, driving in against it the rope K and securing that in place by the iron band M'. By this means of securing the canvas to the floor of the tank all perforation of the sheet and all overlying battens are obviated, and these results are important, for I have found if nails, bolts, or screws, or other fastenings are caused to puncture the fabric the puncture under the upward pressure of the liquid or air tends to constantly enlarge, so that a leak is soon established and soon increased until the operation is practically destroyed, and that if battens are placed down upon the canvas the slimes settle on top of the battens, pack, and prevent the best results, whereas in the construction illustrated nothing overlies the canvas and nothing perforates it. Moreover, from edge to edge of each section the canvas is free to rise or bulge up gently under the impulse of the upflowing fluids and a free filtering-passage permitted throughout the whole extent of the surface of the bottom of the tank.

The liquid contained in the tank A is to be drawn off therefrom by an overflow device of some sort. A very good one for this purpose is illustrated in Fig. 2, and it consists of a jointed pipe N, passing out through the tank side to the launder N'. Within the tank the upper end of this pipe is attached to a float $N^2$, partly sustained by a cord and weight $N^3 N^4$.

The operation of my apparatus as the same is used in auriferous slimes is as follows: The pulverized-rock slimes, fine sand, or sand and slimes containing the gold are run into the tank A, together with the cyanid solution, in proper proportion—say one-third of the solid to two-thirds of the solution up to as high sometimes as equal parts of each. The tank should not be filled entirely full. At least a foot of space at the top should be left to accommodate the ebullition of the contents produced by the next step. The air from the air-supply D is now turned to the pipes E E', and it forces its way up through the canvas into the pulpy mass of slimes, &c., throughout the whole surface of the bottom, producing the ebullition above referred to. The air acts not only to agitate the mass, but also furnishes the oxygen for the chemical action in which the gold enters into combination with the cyanid solution, thus hastening the action of the cyanid upon the gold. In addition to this also the agitating action of the air on the mass operates to stratify the particles of matter according to their varying size and specific gravity, bringing the larger and heavier particles toward the lower and the smaller and lighter particles toward the upper strata. This makes the mass more readily permeable by the uprising liquids. The air is permitted to flow for any desired time until all the gold is dissolved and combined with the cyanid solution. This will take ordinarily from three to five hours. To give a thorough mixing at the end, I prefer to cut off the air-supply from one side of the tank, so that the air at the other side will set the contents to rolling. The air is now cut off and the contents allowed to settle, after which the valves to admit the barren solution from the tank B' are opened and the upflow of this liquid through the canvas started. The pressure of this liquid beneath the contents of the tank is adjusted to that degree that the upflowing liquid will not lift the lightest particles of the slime to the top of the tank. This can be done by adjusting the float $b'$ to the proper head. This can be determined by observing the liquid at the top of the tank A. If the proper head and pressure exist, there will be a zone of clear liquid at the top of said tank A of about a foot in depth. The float $N^2$ is set at such height that no overflow will occur and that only the clear supernatent liquid will be discharged, so that the clear zone will be maintained at a constant depth. After thus passing up through a sufficiency of barren solution to be certain that the gold solution has been mostly carried up and off the valves are shut from tank B' and the valves opened from the tank C', admitting wash-water to flow up through the tank A to displace the barren solution. The flow of wash-water is continued until the barren solution has been displaced in the tank A and some water added to it to compensate for evaporation and other losses. The tank now contains only waste and water and is ready to be discharged. To prevent settling and clogging of the discharge-outlet, (not shown,) I now turn on the air, preferably on both sides, to keep the whole mass in agitation, the discharge-outlet is opened, and the entire contents of the tank A discharged readily, and it is then ready to fill again to repeat the operation.

I claim—

1. In an apparatus for treating material by an upward flow of fluids, the combination of a tank having a bottom perforated for the upward passage therethrough of the fluid, of a lining of textile fabric secured to the bottom of the tank by means of folds of the fabric itself, whereby overlying battens above the fabric are dispensed with and perforation of the fabric obviated, substantially as specified.

2. In an apparatus for treating material by an upward flow of fluids, the combination of a tank having a bottom perforated for the upward passage therethrough of the fluid, of a lining of textile fabric secured to the bottom of the tank by means of folds of the fabric itself, the edges of the fabric being secured to the sides of the tank, whereby overlying battens above the fabric are dispensed with and perforation of the fabric obviated, substantially as specified.

3. The tank having a perforated bottom for the passage therethrough of fluid, combined with a lining of textile fabric secured to the upper surface of the tank-bottom by folds of the fabric inserted in grooves in the tank-bottom, said folds being filled with the packing material, as a rope, and held to the tank-bottom by battens overlying the groove but placed beneath the textile fabric, substantially as specified.

4. The tank having a perforated bottom for the passage therethrough of fluid, combined with a lining of textile fabric secured to the upper surface of the tank-bottom by folds of the fabric inserted in grooves in the tank-bottom, said folds being filled with the packing material, as a rope, and held to the tank-bottom by battens overlying the groove but placed beneath the textile fabric, the edges of the textile fabric being secured to the sides of the tank by means of a groove into which the fabric is inserted, a packing as of rope, and a band setting against the packing, substantially as specified.

5. The combination with a tank having a perforated bottom and an overlying filtering textile fabric secured to the bottom at many points throughout the surface of the fabric, with means for forcing liquid up through the bottom of the tank, substantially as specified.

6. The combination with a tank having a perforated bottom and an overlying filtering textile fabric secured to the bottom at many points throughout the surface of the fabric, with means for forcing liquid up through the bottom of the tank, said means consisting of an elevated tank provided with means for regulating the height of the liquid in said tank, substantially as specified.

7. The combination with a tank having a perforated bottom and an overlying filtering textile fabric secured to the bottom at many points throughout the surface of the fabric, with means for forcing liquid up through the bottom of the tank, said means consisting of an elevated tank provided with means for regulating the height of the liquid in said tank consisting of a float-regulated valve for cutting off and turning on the liquid-supply to the tank, substantially as specified.

8. The tank having a perforated bottom for the upward passage therethrough of fluid, combined with a lining of textile fabric through which the flow must pass, two supply-tanks, one for containing a solution and one for containing water, and a compressed-air or gas supply all connected by pipes to the first-named tank-bottom provided with valves so that fluid from either one of the three can be delivered beneath the textile fabric, substantially as specified.

9. The tank having a perforated bottom for the upward passage therethrough of fluid, combined with a lining of textile fabric through which the flow must pass, two pipes leading beneath the tank connected by risers to different portions of the tank-bottom, and connected to a compressed-air or gas supply, and having valves so that the air or gas may be admitted through part or all of said risers, substantially as specified.

DANIEL C. BOLEY.

Witnesses:
H. M. MUNDAY,
WILLIAM A. GEIGER.